United States Patent [19]
Tamagaki

[11] Patent Number: 5,991,051
[45] Date of Patent: Nov. 23, 1999

[54] IMAGE FORMING APPARATUS AND IMAGE FORMING METHOD

[75] Inventor: Akira Tamagaki, Soraku-gun, Japan

[73] Assignee: Sharp Kabushiki Kaisha, Osaka, Japan

[21] Appl. No.: 08/938,141

[22] Filed: Sep. 26, 1997

[30] Foreign Application Priority Data

Oct. 1, 1996 [JP] Japan ................................. 8-260537

[51] Int. Cl.$^6$ .................................................. H04N 1/40
[52] U.S. Cl. ........................... 358/448; 358/468; 358/401
[58] Field of Search .................... 358/448, 468, 358/400, 401, 500, 501; 355/208

[56] References Cited

U.S. PATENT DOCUMENTS 4,716,438  12/1987  Farrell .......................................... 355/6
5,296,896   3/1994  Nishiyama et al. ..................... 355/208

FOREIGN PATENT DOCUMENTS 64-578      1/1989  Japan .
1-217372    8/1989  Japan .
2-157866    6/1990  Japan .

*Primary Examiner*—Thomas D. Lee
*Attorney, Agent, or Firm*—Dike, Bronstein, Roberts & Cushman, LLP; David G. Conlin

[57] ABSTRACT

In an image forming apparatus of the present invention, in the case where an image information reading mode is set by an operation panel, image information recorded on a rear surface of a document is read as a master CPU, via slave CPUs, instructs a double-sided automatic document transporting device to transport the document in such a manner that the rear surface of the document faces a document plate. The master CPU also instructs the slave CPU to check whether it is possible to recognize the image information thus read. In the case where the image information thus read can be recognized, the master CPU, via the slave CPU, sets the contents of the image information thus read from the rear surface of the document as image forming conditions to be used by an image reading section and an image forming section, thereby permitting to simplify the operation of setting the image forming conditions without causing the deterioration of the quality of a copy image.

12 Claims, 6 Drawing Sheets

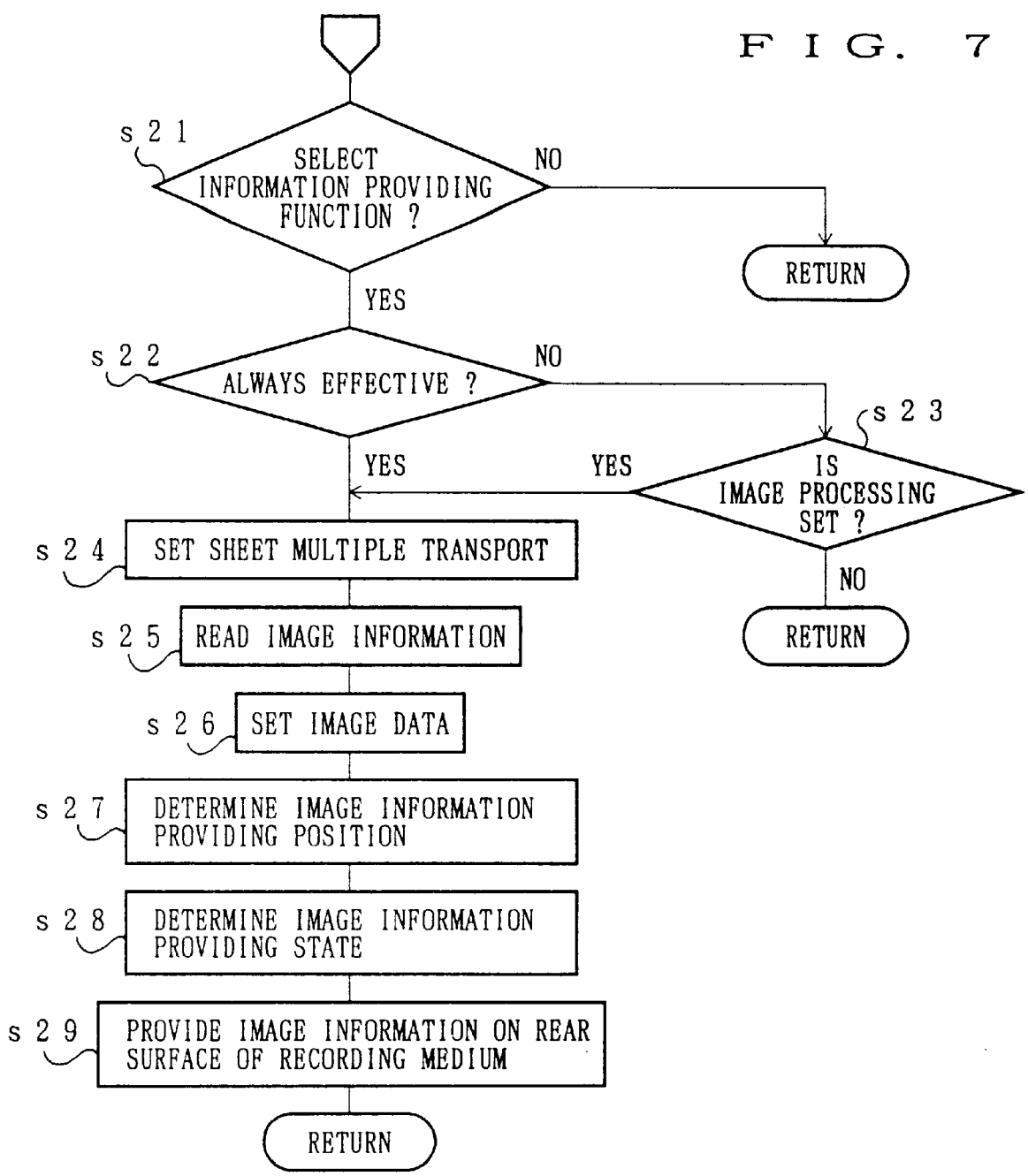

IMAGE FORMING APPARATUS AND IMAGE FORMING METHOD

FIELD OF THE INVENTION

The present invention relates to an image forming apparatus such as a printer and a copying machine, and to an image forming method, and more particularly to an image forming apparatus and an image forming method which carry out an image forming process based on preset image forming conditions.

BACKGROUND OF THE INVENTION

An image forming apparatus reproduces an image signal (image data) which has been read from a document on a recording medium such as a sheet. Such an image forming apparatus includes a printer, a copying machine, and other apparatuses.

In such an image forming apparatus, in order to maintain the image quality of a reproduced image desirably, it is required to set the respective contents of processing to be carried out by an image processing section and an image recording section according to the document image. Such a setting of the processing contents is required, for example, for the case where the amount of light exposed on a document should increased or decreased according to the image density of the document, or for the case where the contrast adjustment should be changed by the image recording section for a photographic image having tones and a character image having no tones.

For this reason, an operation panel of the image forming apparatus is provided with (1) keys for inputting image forming conditions such as image density and a contrast and (2) mode changing keys for manually or automatically setting the image forming conditions.

In the case of sequentially carrying out an image forming process on a plurality of documents by an automatic document transporting device, it is possible that the image density differs in the plurality of documents, and a document having a photographic image and a document having a character image coexist. In this case, in order to obtain a high quality copy image (reproduced image) for each document, it is required to individually set the image forming conditions for each document.

However, if the image forming conditions are to be set solely by the operation of the keys on the operation panel, the operation by an operator becomes complicated when carrying out the image forming process. This presents a problem that it is difficult to completely prevent the deterioration of the image quality of the copy image due to an operational error of the operation panel, and the efficiency of the image forming process is lowered, accordingly. Particularly, in a color image forming apparatus for reproducing a color image, it is required to set various image forming conditions such that it is too complicated and difficult to change and set the image forming conditions for each document.

As a counter measure, Japanese Unexamined Patent publication No. 197965/1988 (Tokukaisho 63-197965) (corresponding to U.S. Pat. No. 4,716,438) discloses an arrangement wherein a sheet called a separator provided with a control code (separate body) is read with a document so as to set image forming conditions based on the control code which has been read from the sheet.

Also, Japanese Unexamined Patent publication No. 578/1989 (Tokukaisho 64-578) discloses an arrangement wherein a bar code control pattern is provided on the front end of a document so as to set image forming conditions based on the contents of the bar code thus read as a partial image of the document.

Further, Japanese Unexamined Patent publication No. 157866/1990 (Tokukaihei 2-157866) discloses an arrangement wherein a specifying pattern for specifying how the operation should be carried out is provided on a document so as to set image forming conditions based on the specifying pattern.

Furthermore, Japanese Unexamined Patent publication No. 281474/1992 (Tokukaihei 4-281474) (corresponding to U.S. Pat. No. 5,296,896) discloses an arrangement wherein coded image forming conditions are provided on a portion of a transfer sheet so as to set image forming conditions based on the contents of the code thus read by reading means.

However, according to the inventions disclosed in the above-mentioned Japanese Unexamined Patent publication No. 578/1989 (Tokukaisho 64-578) and Japanese Unexamined Patent publication No. 157866/1990 (Tokukaihei 2-157866), information indicative of image forming conditions is provided on an image formed surface of a document. This presents problems that a portion of a document image is not reproduced, and the information thus provided is reproduced as a partial document image. This interferes with observing of a reproduced image so as to lower the quality of the copy image. Therefore, the inventions disclosed in the above-mentioned publications are not suitable for a color document image in particular in which a high image quality is demanded.

Also, according to the invention disclosed in Japanese Unexamined Patent publication No. 197965/1988 (Tokukaisho 63-197965), the control code indicative of the image forming conditions is provided on a control sheet which is different from a document. Thus, the control sheet can easily be lost or misused, thereby presenting the problem that the control sheet is not easy-to-use.

Further, according to the invention disclosed in Japanese Unexamined Patent publication No. 281474/1992 (Tokukaihei 4-281474), the code indicative of the image forming conditions is provided on a sheet (transfer sheet). This presents a problem that the copy image partially overlaps the code, and the copy image and the code become close to one another so as to make the copy image difficult to be recognized, thereby resulting in that the image quality deteriorates.

SUMMARY OF THE INVENTION

It is an object of the present invention to provide an easy-to-use image forming apparatus and image forming method in which the setting of image forming conditions can be simplified without causing the image quality of a copy image to deteriorate.

In order to achieve the above-mentioned object, an image forming apparatus of the present invention is characterized in that image forming conditions are set based on image information which has been read from a rear surface of a document so as to carry out an image forming process with respect to an image on the front surface of the document.

With this arrangement, the image information indicative of the image forming conditions are provided beforehand on the rear surface of the document, thereby permitting to automatically set optimum image forming conditions for the document image according to the image information.

Further, because the image information is integrally provided on the document (not separately provided from the document), the image information can be prevented from being lost or misused.

Moreover, with the described arrangement, the image information is provided on the rear surface of the document, thereby preventing (1) the image information from interfering with the observing of the image on the front surface of the document and (2) the quality of the copy image from being deteriorated.

A second image forming apparatus of the present invention is characterized by including a double-sided automatic document transporting device for, after transporting a document such that its rear surface provided with an image information faces reading means, transporting the document so as to make the front surface of the document to face the reading means.

With this arrangement, when a document having an image and image information on the front surface and the rear surface, respectively, is provided in the double-sided automatic document transport device, optimum image forming conditions are automatically set for a document image based on the image information which has been read from the rear surface of the document.

A third image forming apparatus of the present invention is characterized in that image information indicative of image forming conditions in accordance with an image formed on the front surface of a sheet is provided on the rear surface of the sheet.

With this arrangement, the image forming conditions are set referring to image information provided on the rear surface of the sheet, thereby permitting to reproduce the image formed on the front surface of the sheet in accordance with the image information.

A fourth image forming apparatus of the present invention is characterized in that a position and a state of image information to be provided on the rear surface of the sheet are set based on a position and a state of an image formed on the front surface of the sheet.

With this arrangement, when recognizing the image formed on the front surface of the sheet, the image information provided on the rear surface of the sheet neither protrudes from nor is seen through the image formed on the front surface of the sheet, thereby preventing that the image information makes (1) the image on the front surface of the document hard-to-recognize or (2) the quality of the copy image to deteriorate.

A fifth image forming apparatus of the present invention includes an image reading section for reading an image signal from a document having the image on a front surface, an image forming section for forming a copy image on a sheet according to the image thus read, the copy image being formed based on image forming conditions corresponding to the image, and a control section for reading image information indicative of the image forming conditions through the image reading section, the image information being provided on a rear surface of the document.

With this arrangement, the image information indicative of the contents of the image forming conditions can be read from the document by the image reading section, thereby permitting the image forming section to form on a sheet a copy image based on the image forming conditions which can be optimized.

Incidentally, in the case of providing image information on the front surface of the document, the image information is read by the image reading section together with the image formed on the front surface of the document so as to be converted to a copy image by the image forming section. This presents problems in that it is difficult to recognize the image on the front surface of the document due to the image information copied together with the image, and the image quality of the copy image lowers.

However, with the described arrangement, the image information is provided on the rear surface of the document by the control section, and the image information thus provided beforehand on the rear surface of the document can be read by the image reading section. Hence, the above-mentioned problems can be prevented.

Further, with the described arrangement, image information can be integrally provided on the document. Thus, compared with the case of separately providing image information, it is possible to prevent the image information from being lost or misused.

An image forming method of the present invention includes the steps of reading image information on a rear surface of a document having an image on its front surface, and carrying out an image forming process with respect to the image on the front surface of the document according to image forming conditions which has been set based on the image information thus read.

According to this method, image information indicative of the contents of the image forming conditions can be provided beforehand on the rear surface of the document, thereby permitting to automatically set the optimum image forming conditions for a document image according to the image information.

Further, according to the above-mentioned method, the image information is integrally provided on the document, thereby preventing the image information from being lost or misused.

Furthermore, according to the above-mentioned method, the image information is provided on the rear surface of the document, thereby preventing problems that it is difficult to recognize the image on the front surface of the document due to the image information copied together with the image, and the image quality of the copy image lowers.

For a fuller understanding of the nature and advantages of the invention, reference should be made to the ensuing detailed description taken in conjunction with the accompanying drawings.

BRIEF DESCRIPTION OF THE DRAWINGS

FIG. 7 is a flowchart showing steps of a control section of a copying machine in accordance with another embodiment of the present invention.

DESCRIPTION OF THE EMBODIMENTS

Figure 1:
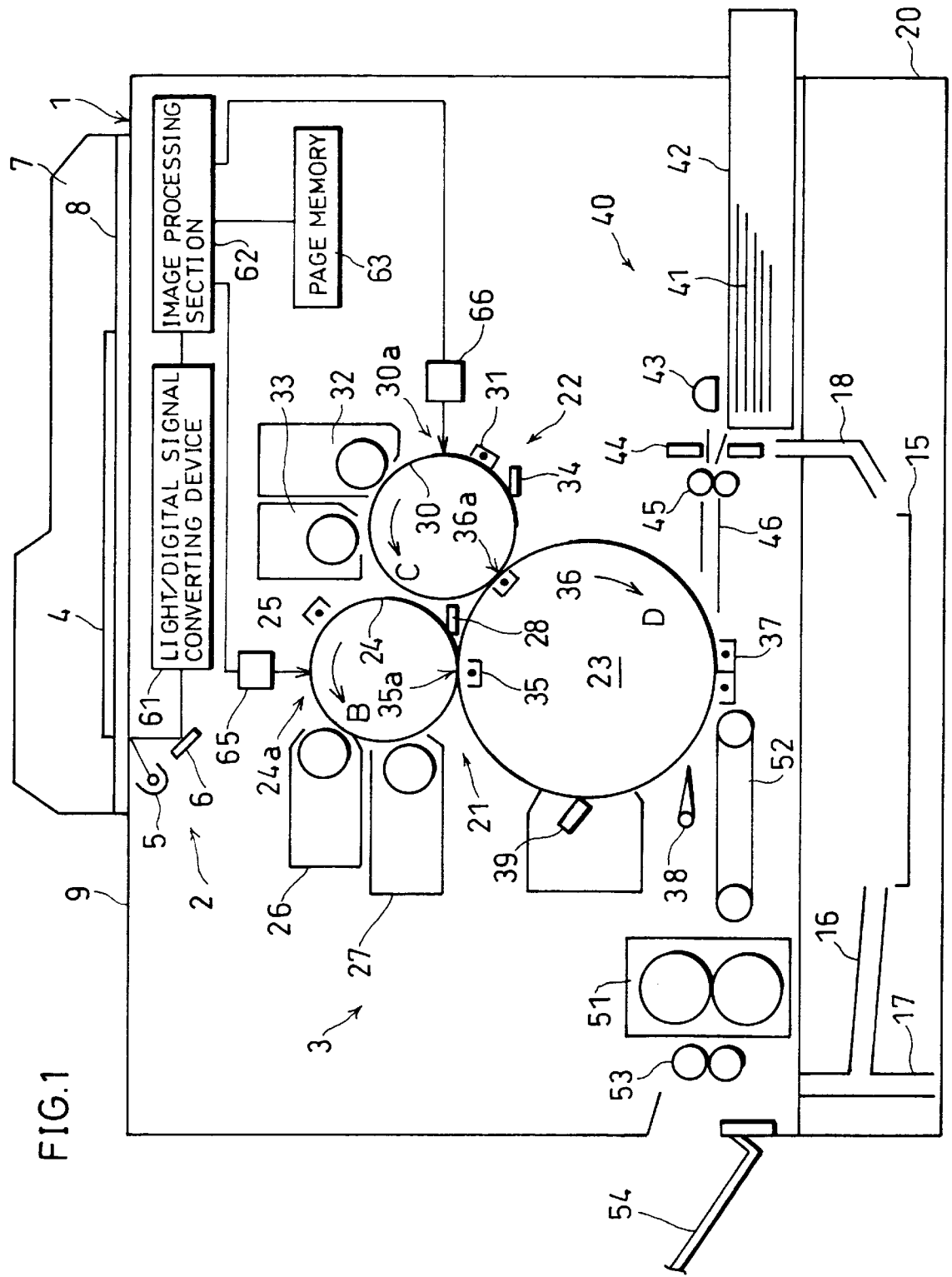
FIG. 1 is a schematic frontal cross sectional view showing a structure of a copying machine as an image forming apparatus in accordance with one embodiment of the present invention.

FIG. 1 is a schematic frontal cross sectional view showing a structure of a digital copying machine as an image forming apparatus in accordance with one embodiment of the present invention. The upper surface of a copying machine main body 1 of the digital copying machine is provided with a document plate 8, an operational panel 9, and a double-sided automatic document transporting device 7. A multiple copying unit 20 is provided below the copying machine main body 1.

On the upper surface of the copying machine main body 1, the double-sided automatic document transporting device (reversing section) 7 is mounted on the document plate 8. The double-sided automatic document transporting device 7 transports a document 4 such that one surface of the document 4 faces the document plate 8, and after the image on this surface of the document 4 is read, the double-sided automatic document transporting device 7 reverses the document 4 such that the other surface thereof faces the document plate 8 so as to be transported to the document plate 8. After images formed on the both surfaces of the document 4 are read, the double-sided automatic document transporting device 7 discharges the document 4 when having finished the image reading so as to carry out the double-sided transporting operation on the next document.

An image forming section 3 is provided with a first processing section 21, a second processing section 22, and an intermediate transfer drum 23. The first processing section 21 is provided with (1) a photoreceptor 24 which rotates in a direction of the arrow B in FIG. 1, (2) a charger 25 for charging the surface of the photoreceptor 24 with a unipolar charge, (3) a developing device 26 for supplying first color developer onto the surface of the photoreceptor 24, (4) a developing device 27 for supplying third color developer onto the surface of the photoreceptor 24, and (5) a cleaning blade 28 for removing developer remaining on the surface of the photoreceptor 24.

Similarly, the second processing section 22 is provided with (1) a photoreceptor 30 which rotates in a direction of the arrow C in FIG. 1, (2) a charger 31 for charging the surface of the photoreceptor 30 with a unipolar charge, (3) a developing device 32 for supplying second color developer onto the surface of the photoreceptor 30, (4) a developing device 33 for supplying fourth color developer onto the surface of the photoreceptor 30, and (5) a cleaning blade 34 for removing developer remaining on the surface of the photoreceptor 30.

According to this arrangement, the surface of the photoreceptor 24, which has been charged with a unipolar charge by the charger 25, is exposed in accordance with a first color image signal by a photoreceptor exposing device 65 of the image reading section 2 (described later) such that an electrostatic latent image of the first color image is formed on the surface of the photoreceptor 24. The first color developer is supplied to the electrostatic latent image thus formed from the developing device 26 such that a first color visible image is formed on the surface of the photoreceptor 24. The first color visible image thus formed is then transferred to the surface of the intermediate transfer drum 23 by a transfer unit 35 (described later) . The surface of the photoreceptor 24 on which the visible image has been transferred is charged again by the charger 25 after the developer and the charge both remaining on the surface of the photoreceptor 24 are removed respectively by the cleaning blade 28 and a static eliminator (not shown).

Thereafter, the surface of the photoreceptor 24 is exposed in accordance with a third color image signal by a photoreceptor exposing device 65 such that an electrostatic latent image of the third color image is formed on the surface of the photoreceptor 24. The third color developer is supplied to the electrostatic latent image thus formed from the developing device 27 such that a third color visible image is formed on the surface of the photoreceptor 24. The third color visible image thus formed is then transferred to the surface of the intermediate transfer drum 23 by a transfer unit 35. The developer and the charge both remaining on the surface of the photoreceptor 24, on which the third color visible image has been transferred, are removed respectively by the cleaning blade 28 and a static eliminator (not shown).

In contrast, the surface of the photoreceptor 30, which has been charged with a unipolar charge by the charger 31, is exposed in accordance with a second color image signal by a photoreceptor exposing device 66 such that an electrostatic latent image of the second color image is formed on the surface of the photoreceptor 30. The second color developer is supplied to the electrostatic latent image thus formed from the developing device 32 such that a second color visible image is formed on the surface of the photoreceptor 30. The second color visible image thus formed is then transferred to the surface of the intermediate transfer drum 23 by a transfer unit 36 (described later) . The surface of the photoreceptor 30 on which the visible image has been transferred is charged again by the charger 31 after the developer and the charge remaining on the surface of the photoreceptor 30 are removed respectively by the cleaning blade 34 and a static eliminator (not shown).

Thereafter, the surface of the photoreceptor 30 is exposed in accordance with a fourth color image signal by a photoreceptor exposing device 66 such that an electrostatic latent image of the fourth color image is formed on the surface of the photoreceptor 30. The fourth color developer is supplied to the electrostatic latent image thus formed from the developing device 33 such that a fourth color visible image is formed on the surface of the photoreceptor 30. The fourth color visible image thus formed is then transferred to the surface of the intermediate transfer drum 23 by a transfer unit 36. The developer and the charge remaining on the surface of the photoreceptor 30, on which the fourth color visible image has been transferred, are removed respectively by the cleaning blade 34 and a static eliminator (not shown).

Photoreceptor exposing devices 65 and 66 project laser beams respectively on the photoreceptors 24 and 30 based on the first through fourth color image signals. This starts in accordance with a timing when front end positions of respective images formed on the surfaces of the photoreceptors 24 and 30 face a corresponding position on the surface of the intermediate transfer drum 23. Thus, the first through fourth color visible images formed on the surface of the photoreceptors 24 and 30 are transferred onto the surface of the intermediate transfer drum 23 such that the images coincide on the same position on the intermediate transfer drum 23.

The transfer units 35 and 36 are provided on positions, on the inner wall of the intermediate transfer drum 23, respectively facing the photoreceptors 24 and 30. The transfer units 35 and 36 transfer the visible images formed on the photoreceptors 24 and 30 onto the outer surface of the intermediate transfer drum 23. A transfer unit 37, a detaching nail 38, and a cleaning blade 39 are provided so as to face the outer surface of the intermediate transfer drum 23 rotating in a direction of the arrow D in FIG. 1. The transfer unit 37 transfers the image formed on the surface of the intermediate transfer drum 23 onto a sheet by corona discharge. The detaching nail 38 detaches the sheet from the surface of the intermediate transfer drum 23. The cleaning blade 39, after the image has been transferred by the transfer unit 37, contacts the surface of the intermediate transfer drum 23 so as to remove remaining developer from the intermediate transfer drum 23.

On one side in the lower portion of the copying machine main body 1, a sheet cassette 42 storing sheets 41 is provided. The sheet cassette 42, a sheet supplying roller 43, a sheet sensor 44, resist rollers 45, and a paper guide 46 constitute a sheet supplying section 40. The sheet supplying roller 43 supplies sheets stored in the sheet cassette 42 one by one before the intermediate transfer drum 23 starts rotating. The sheet sensor 44 detects the presence or absence of the sheet 41 to be supplied. The resist rollers 45 guide the supplied sheet 41 between the intermediate transfer drum 23 and the transfer unit 37 in accordance with a timing at which the front end of the sheet 41 (facing the transfer unit 37) coincides with the front end of the image formed on the intermediate transfer drum 23. Here, the paper guide 46 acts as a sheet transport path.

On the other side of the copying machine main body 1, a sheet discharge tray 54 is provided. In the copying machine main body 1, a transfer belt 52, a fixing unit 51, and discharge rollers 53 are provided between the intermediate transfer drum 23 and the discharge tray 54. The transfer belt 52 transfers the sheet 41, on which the image formed on the surface of the intermediate transfer drum 23 has been transferred, to the fixing unit 51. The fixing unit 51 applies heat and pressure to the sheet 41 so as to fuse and fix the image which has been transferred onto the sheets 41. The discharge rollers 53 discharge the sheets 41 which have passed through the fixing unit 51 to the discharge tray 54.

In the multiple copying unit 20, an intermediate tray 15, a multiple transport path 16, a reverse transport path 17, and a sheet resupplying transport path 18 are provided. The multiple transport path 16 is provided so that (1) a space between the discharge rollers 53 and the discharge tray 54 in the copying machine main body 1 communicates with (2) the intermediate tray 15 and the reverse transport path 17. The intermediate tray 15 temporarily stores the sheet which has been subjected to the image forming process. The reverse transport path 17 turns over the sheet. The sheet resupplying transport path 18 is provided so that (a) the intermediate tray 15 communicates with (b) a space between the sheet supplying roller 43 and the resist rollers 45.

In the double-sided copying mode wherein images are formed on the both surfaces of a sheet, a sheet having an image on its front surface, after passing through the fixing unit 51 and the discharge rollers 53, is transported to the reverse transport path 17 through the multiple transport path 16 by a flapper (not shown) such that the sheet is turned over so as to be stored in the intermediate tray 15. The sheet thus stored in the intermediate tray 15 is transported in accordance with a predetermined timing to the resist rollers 45 by sheet resupplying rollers (not shown) through the sheet resupplying transport path 18. The sheet thus transported to the resist rollers 45 is then transported by the rotation of the resist rollers 45 to a space between the intermediate transfer drum 23 and the transfer unit 37 so that the rear surface of the sheet faces the intermediate transfer drum 23. The sheet having an image on its rear surface is discharged to the discharge tray 54 by the discharge rollers 53 after passing through the fixing unit 51 so as to be fixed.

Figure 2:
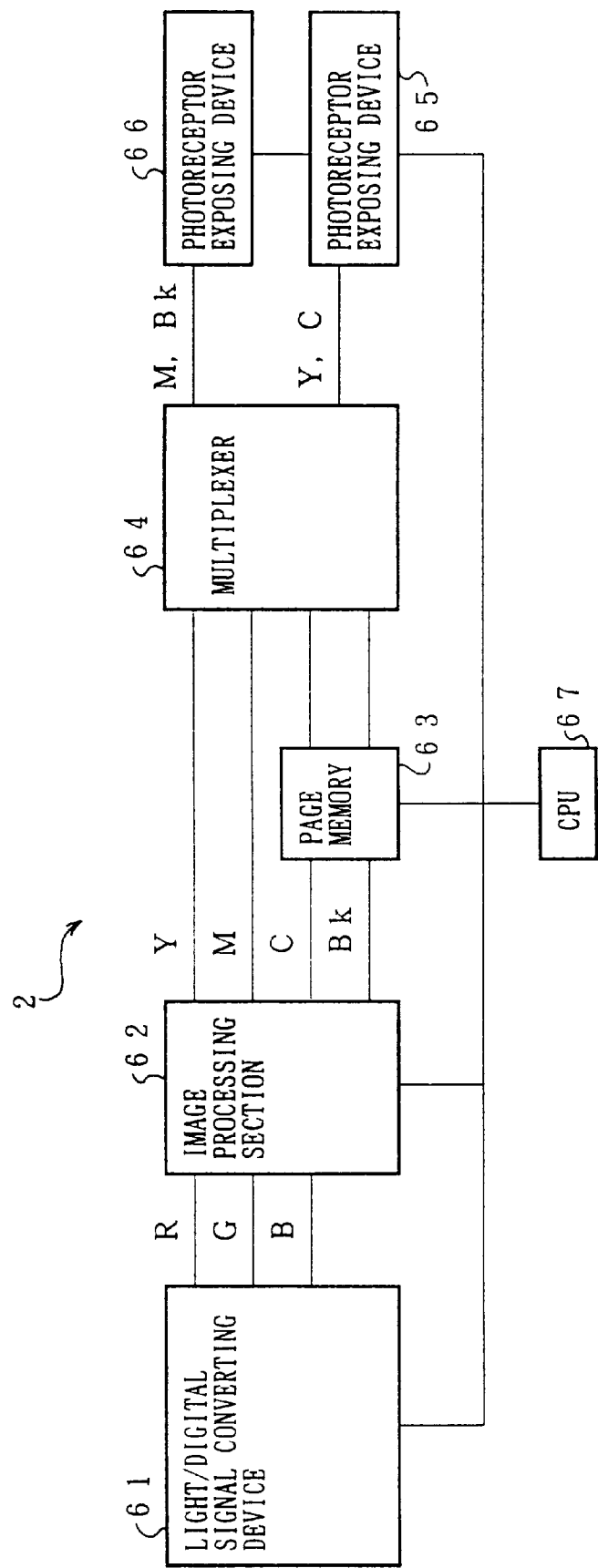
FIG. 2 is a block diagram showing a structure of an image reading section of the copying machine.

FIG. 2 is a block diagram showing a structure of the image reading section of the digital copying machine. The image reading section 2 (document reading means) is provided with (1) a light/digital signal converting device 61 for converting reflected light off the document 4 to a digital signal, (2) an image processing section 62 for image processing an output signal from the light/digital signal converting device 61, (3) a page memory 63 for temporarily storing an image signal outputted from the image processing section 62, (4) a multiplexer 64 for selectively switching between the image signals outputted from the image processing section 62 and the page memory 63 so as to supply the selected image signal to the photoreceptor exposing devices 65 and 66, and (5) a CPU 67 for controlling (a) the photoreceptor exposing devices 65 and 66 which respectively expose the photoreceptors 24 and 30 based on the image signal as selected by the multiplexer 64 and (b) the entire operation of the image reading section 2.

The light/digital signal converting device 61 is provided with a lens and a charge coupled device (CCD) etc. Reflected light off the document 4 converges on the CCD via the lens. The CCD is provided with filters respectively corresponding to R, G, and B, which are three primary colors for additive mixing, so as to output electrical signals respectively in accordance with the density of R, G, and B to the image processing section 62 via an A/D converter (not shown).

The image processing section 62 carries out image processing with respect to the signals outputted from the light/digital signal converting section 61 so as to output first and second color image signals (for example, yellow and magenta, respectively) to the multiplexer 64. In contrast, the image processing section 62 outputs third and fourth color image signals (for example, cyan and black, respectively) to the page memory 63. The page memory 63 temporarily stores the third and fourth color image signals (for example, cyan and black, respectively), and outputs the stored image signals to the multiplexer 64 based on a control signal outputted from the CPU 67.

The image processing section 62 is provided with a detecting section which detects a position and a state of a copy image to be formed on the front surface of a sheet based on image signals for forming the copy image. The state of the copy image indicates an image density of each portion of the copy image.

The CPU 67 includes setting means for setting a position and a state of the image information to be provided on the rear surface of the sheet based on the position and the state of the copy image as detected by the detecting section. Note that, the CPU 67 also acts as an image information providing section which provides image information to the rear surface of a sheet based on an instruction from a master CPU 84.

The multiplexer 64 supplies (1) the first and third color image signals (for example, yellow and cyan, respectively) in this order to the photoreceptor exposing device 65, and (2) the second and fourth color image signals (for example, magenta and black, respectively) in this order to the photoreceptor exposing device 66. The photoreceptor exposing devices 65 and 66 respectively project laser beams on the photoreceptors 24 and 30 based on the image signals supplied from the multiplexer 64 so as to expose the photoreceptors 24 and 30. Note that, LED may be used to expose the photoreceptors 24 and 30. Upon exposing the photoreceptor 24, an electrostatic latent image is formed on the surface of the photoreceptor 24.

Figure 3:
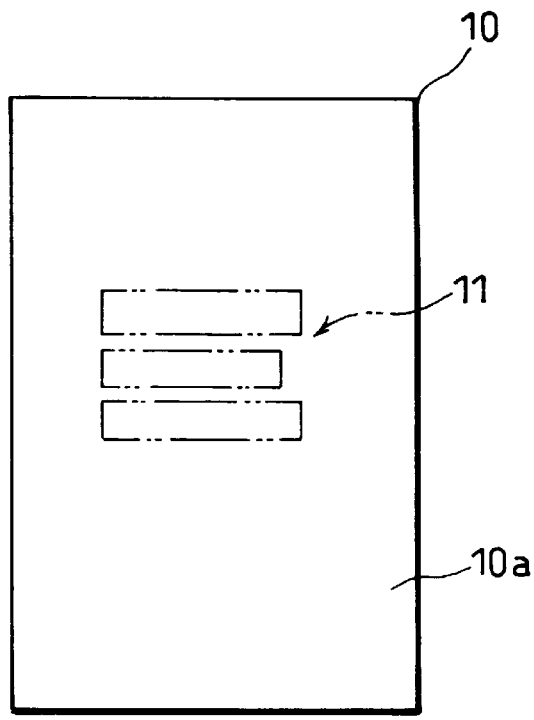
FIG. 3 is a plan view showing a rear surface of a document used for an image forming process of the copying machine.

FIG. 3 shows a rear surface of a document adopted in the image forming process of the copying machine. On a surface, on which an image is not formed, of a document 10 (a rear surface 10a of the document 10), image information 11 indicative of image forming conditions is provided. The image information 11 may be expressed in the forms of (1) characters or numbers indicating the setting contents of the image forming conditions, (2) graphics patterning the setting contents of the image forming conditions, or (3) bar codes coding the setting contents of the image forming conditions, etc. The image forming conditions indicated by the image information 11 include (a) standard density of a document, (b) distinction between a color document and a monochromatic document, (c) separation information of photographic/character area on a document, and (d) separation information of copy area/non-copy area on a document. (a) The standard density of a document is image information for forcibly setting image density of the document, which determines (1) the amount of exposing light when reading an image and (2) the amount by which the lightness should be corrected when processing an image. In the case of adjusting the amount of exposing light and the amount by which the lightness should be corrected by an automatic density adjusting function based on the lightness of the entire document image so as to read and/or record the image while an automatic density adjusting mode of the copying machine is set, it is possible that the image is recorded in accordance with a density different from that of the document, thereby deteriorating an image quality of a color image in particular. Thus, when a document image is to be read and/or recorded without changing the density, by reading or recording an image based on the image forming conditions of the image information, it is possible to accurately reproduce an image of a document.

(b) The distinction between a color document and a monochromatic document is image information indicating whether a document image is colored or monochromatic, which determines (1) how the image signal should be processed when processing the image and (2) the operation state of the image recording section when recording an image. Generally, an image is read and/or recorded in a color mode when the document is colored, whereas an image is read and/or recorded in a monochromatic mode when the document is monochromatic. By setting the mode of the copying machine based on the image information, even in the case where color documents and monochromatic documents coexist in a plurality of documents, it is possible to automatically process each type of the document in accordance with an optimum mode.

(c) The separation information of photographic/character area is image information indicating whether a document is a photographic document or a character document, which determines how an image signal should be corrected when processing an image. (1) Information for specifying a photographic region and a character region in an image of a single document is provided as the image information in the case where a photographic region and a character region coexist in an image of a single document, and (2) information for specifying whether a document is a photographic document and a character document for each of a plurality of documents is provided as the image information in the case where photographic documents and character documents coexist in a plurality of documents. By setting image forming conditions based on the image information, a user is not required to selectively input a photographic mode or a character mode, thereby permitting to automatically carry out an image forming process in accordance with an optimum mode.

Further on the region separation, a document image includes two types of regions: one whose image density is required to be expressed in tones as in a photographic image, and one whose image density is not required to be expressed in tones, but required to be expressed with thin lines as in a character image. In the case where the two types of regions coexist in a single document, the following process is carried out with respect to the entire surface of the document so as to strictly distinguish the photographic region from the character region. A target pixel and pixels surrounding thereof are compared with respect to density, and when the change in density is gradual, it is judged that the target pixel belongs to a photographic region, whereas when the change in density is sudden, it is judged that the target pixel belongs to a character region. This region separating process is carried out when reading an image, and the photographic region is expressed in tones based on the region separation information when recording the image, whereas the character region is expressed with thin lines, thereby improving the quality of the reproduced image of the document image.

(d) The separation information of the copy ares and non-copy area of a document is image information indicating a required area of a document image, which determines the area in a document image to be read when reading the image. The image information is provided for specifying an area to be copied and an area explaining thereof in the case where the two areas coexist in a document. By setting image forming conditions based on the image information, it is possible to read or record an image with respect to only the copy area.

Figure 4:
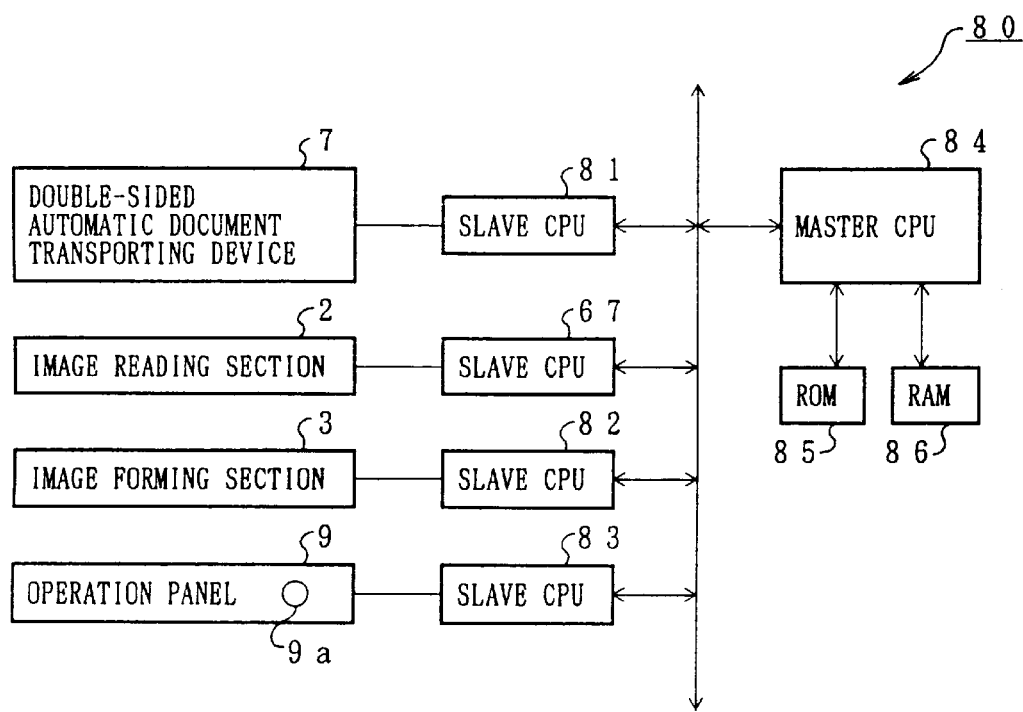
FIG. 4 is a block diagram showing a structure of a control section of the copying machine.

FIG. 4 is a block diagram showing a structure of a control section of the copying machine. A control section 80 of the copying machine main body 1 is provided with a master CPU 84 (main-controlling means) and slave CPUs 67, and 81 through 83 (sub-controlling means). The double-sided automatic document transporting device 7, the operation panel 9, the image reading section 2, and the image forming section 3 are respectively controlled by the slave CPUs 81, 83, 67, and 82.

The slave CPUs 67, and 81 through 83, in turn, are controlled by the master CPU 84 to which a ROM 85 and a RAM 86 are connected. The ROM 85 is provided with a program for specifying control processing steps of the master CPU 84. The RAM 86 stores data to be inputted to and outputted from the master CPU 84 during the control processing. Note that, it is possible to supply the program for specifying the control processing steps of the master CPU 84 from a recording medium such as a CDROM or an HDD.

Each of the slave CPUs 67, and 81 through 83 also functions as detecting means, in the image reading section 2 and the image forming section 3, for detecting a range of states in which an image can be processed. In the image reading section 2, the range of states indicates reading accuracy such as (1) the accuracy of tone density in a photographic image and (2) the accuracy of reading thin lines in a character image. In the image forming section 3, the range of states indicates (a) whether it is possible to perform color copying, (b) whether it is possible to express a copy image in tones, and (c) the accuracy of copying of thin lines.

The master CPU 84, in response to the slave CPUs 67, and 81 through 83 (detecting means) and to the image information of the image reading section 2, also functions as a judging section for judging whether it is possible to set at least partially the contents of the image information as an image processing condition.

When it is judged by the master CPU 84 that it is impossible to set at least partially the contents of the image information as an image processing condition, the master CPU 84, based on the range of states as detected by the detecting means, sets another settable image forming condition, and reads and/or records the image in accordance with the foregoing another image forming condition. Thus, the master CPU 84 functions as a selecting section for alleviating the recognized conditions (condition alleviating mode). The foregoing another image forming condition is settable to the content of the image forming condition included in the image information.

Figure 5:
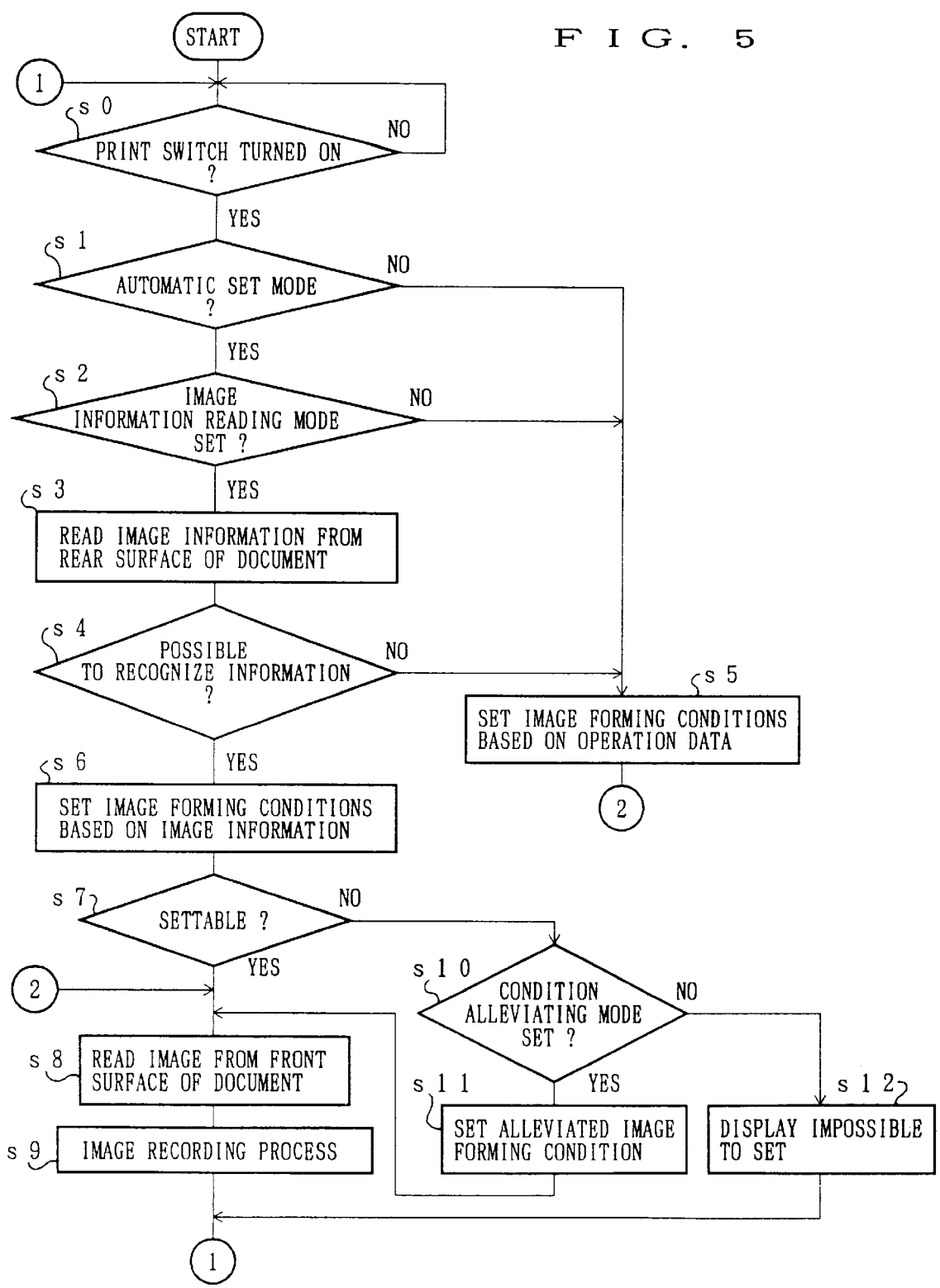
FIG. 5 is a flowchart showing steps of the control section of the copying machine.

FIG. 5 is a flowchart showing processing steps of the control section of the copying machine. The master CPU 84 waits for an operation signal of a print switch to be inputted from the slave CPU 82 (s0). The master CPU 84, upon receiving the operation signal of the print switch from the slave CPU 82, based on the presence or absence of a document set signal from the slave CPU 81, judges whether (1) an automatic set mode has been selected by the double-sided automatic document transporting device 7 or (2) a manual set mode has been selected by the manual operation of an operator (s1).

When a document is set on the double-sided automatic document transporting device 7, and the document set signal is inputted from the slave CPU 81, the master CPU 84 judges that the automatic set mode has been selected, and judges whether an image information reading mode is set in accordance with the operation data of the operation panel 9 inputted from the slave CPU 82 (s2).

In the case where the image information reading mode is set through the operation panel 9, the master CPU 84 instructs, via the slave CPU 81, the double-sided automatic document transporting device 7 to transport the document so that the rear surface of the document faces the document plate 8, thereby resulting in that the image information recorded on the rear surface of the document is read (s3). The master CPU 84 also instructs the slave CPU 67 to check if it is possible to recognize the image information thus read (s4). In the case where it is possible for the CPU 67 to recognize the image information thus read, the master CPU 84 sets, via slave CPUs 67 and 82, respectively, the contents of the image information thus read from the rear surface of the document as respective image forming conditions for the image reading section 2 and the image forming section 3 (s6).

In the case where it is possible to set the content of the image information as image forming conditions, the master CPU 84 instructs, via the slave CPU 81, the double-sided automatic document transporting device 7 to turn over the document on the document plate 8 so as to transport the document again to the document plate 8. Thereafter, the master CPU 84 controls the image reading section 2 so as to read the image on the front surface of the document according to the image forming conditions thus set, and the master CPU 84 carries out image processing with respect to the image signal thus read (s7 to s8). The master CPU 84 then controls the image forming section 3 according to the image forming condition thus set so as to carry out image recording with respect to the image signal which has been subjected to the image processing (s9).

In the case where a document is not set on the double-sided automatic document transporting device 7 and the automatic set mode is not set, when the image information reading mode is not set and it is impossible to recognize the image information which has been read, the master CPU 84 sets the image forming conditions based on operation data of the operation panel 9 inputted from the slave CPU 83 so as to read and record the image (s5 to s8).

In the case where it is impossible to set partially or entirely the contents of the image information as image forming conditions, the master CPU 84, referring to the operation data of the operation panel 9 inputted from the slave CPU 83, judges whether the condition alleviating mode is set in which image processing is carried out within a possible range (s7 to s10) In the case where the condition alleviating mode is set, the master CPU 84 reads and/or records an image in accordance with settable optimum image forming conditions among the image forming conditions included in the image information (s1 to s8).

For example, in the case where the copying machine main body 1 is provided with only a black developing device even though it is indicated by the image information that the documents contain a color photographic document, a monochromatic photographic mode is set so as to obtain a copy image having high tones.

In the case where the condition alleviating mode is not set, the master CPU 84, via the slave CPU 83, displays a notice on a display section of the operation panel 9 indicating that it is impossible to set image forming conditions suitable for the contents of the image information (s12). In this case, the master CPU 84 returns to a standing-by state without reading or recording an image. For example, in the case where the copying machine main body 1 is not provided with a separation processing function even though separation information is included in the image information, the master CPU 84 displays a notice indicating that it is impossible to carry out the separation processing.

Note that, in the case where the condition alleviating mode is set, after displaying the notice indicating that it is impossible to set image forming conditions suitable for the image information, it is possible to read and/or record an image according to settable optimum image forming conditions among the image forming conditions included in the image information.

According to the described processing, image information recorded on the rear surface of a document is read so as to set image forming conditions for the image reading section 2 and the image forming section 3, respectively, based on the contents of the image information thus read, thereby permitting to read and/or record an image on the front surface of a document based on the contents of the image information recorded on the rear surface of the document.

Further, according to the described processing, even in the case where image forming conditions differ for each document or for each portion of a single document, it is possible to automatically set image forming conditions corresponding to each document or each portion of the document. This greatly simplifies the operation by an operator when carrying out the image forming process, and prevents with certainty the copying error due to a setting error of image forming conditions, thereby improving the efficiency of the image forming process.

Note that, the copying machine main body 1 can be arranged such that image information is written down on the rear surface of a document. For this purpose, the image forming section 3 can be adopted. Also, it may be possible to record image information by the image forming section 3 on a sheet which can be attached to the rear surface of a document.

Figure 6:
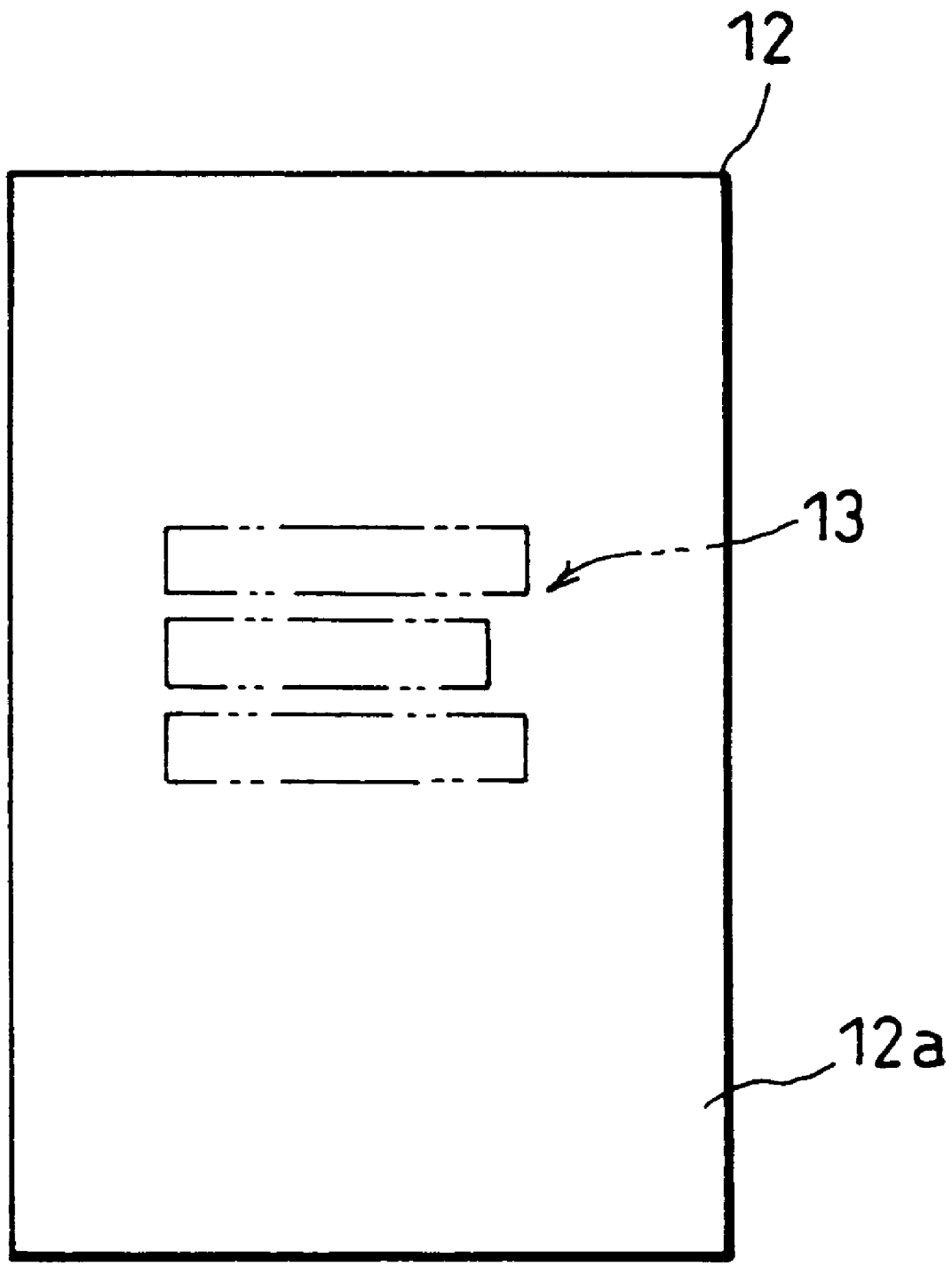
FIG. 6 is a plan view showing a rear surface of a document having a front surface on which an image has been formed by a copying machine as an image forming apparatus in accordance with another embodiment of the present invention.

FIG. 6 is a drawing showing a rear surface of a sheet on which an image has been formed by the copying machine as an image forming apparatus in accordance with another embodiment of the present invention. In the copying machine of the present embodiment, a sheet 12 having a document image on its front surface is transported again to the image forming section 3 via the transporting section of the multiple copying unit 20 so as to be provided with image information 13 on its rear surface (rear surface 12a). The image information 13 may be expressed in the form of characters or numbers indicating the setting contents of image forming conditions. The image forming conditions indicated by the image information 13 include (a) mode selection, (b) density setting, (c) color balance setting, (d) region separation information, and (e) information of external devices.

(a) The mode selection is image information for indicating a mode which has been set when forming an image on a sheet so as to determine, (1) for a document in which a character region and a photographic region coexist, which one of the character region and the photographic region has a priority over the other or (2) whether to record or reproduce with respect to both of the regions. When forming another image with respect to the document image formed on the sheet, by forming the image based on the image information, it is possible to obtain an image having substantially the same image quality as the original image.

(b) The density setting is image information indicating (1) whether the density adjustment is set by an automatic mode or a manual mode when forming the image or (2) the setting level of the manual mode. When forming another image with respect to the document image formed on a sheet, by forming the image based on the image information, it is possible to obtain an image having substantially the same density as the original image.

(c) The color balance setting is image information for indicating (1) whether the color balance adjustment is set by the automatic mode or the manual mode when forming the image or (2) the setting level of the manual mode. When forming another image with respect to the document image formed on a sheet, by forming the image based on the image information, it is possible to obtain an image having substantially the same color balance as the original image.

(d) The region separation information is image information for (1) indicating a photographic region and a character region in the case where a photographic region and a character region coexist in a single document which is subjected to the image processing, and (2) indicating whether a document is a photographic document or a character document in the case where photographic documents and character documents coexist in a plurality of documents. When forming another image with respect to the document image formed on a sheet, by forming the image based on the image information, it is possible to omit an input process for specifying (1) a photographic region or a character region and (2) a photographic document or a character document.

(e) The information of external devices is image information for specifying an external device which has outputted an image signal in the case where such an image signal of image formation is outputted from the external devices. By referring to the image information when forming another image with respect to the document image formed on a sheet, it is possible to specify the respective external devices from which an image signal should be outputted.

FIG. 7 is a flowchart showing processing steps of a control section of the copying machine in accordance with the present embodiment. The copying machine is provided with a key 9a on the operation panel 9 (see FIG. 4). The key 9a receives (1) an input for selecting an information providing function which provides image information to the rear surface of a sheet, and (2) an input for setting whether to make the information providing function effective only in a manual mode. The master CPU 84, after forming an image of a document image, checks how the operation panel 9 is operated via the slave CPU 83 (s21). In the case where the information providing function is selected through the operation panel 9, the master CPU 84 judges, referring to the key 9a, whether the information providing function is effective only in a manual mode (s22).

In the case where a manual mode is set when the information providing function is effective only in the manual mode (s23), or in the case where the information providing function is always effective, in order to store a sheet which has been turned over in the intermediate tray 15, the master CPU 84 controls a flapper so as to guide the sheet, which has passed through the discharge rollers 53, to the multiple transport path 16 and the reverse transport path 17 (s24).

Thereafter, the master CPU 84 reads from a RAM 86 image information such as a mode selection state, a density set state, a color balance set state, region separation information, and information of external devices (s25) so as to store the above image information in the page memory 63 as image signals of an image to be formed on the rear surface of the sheet (s26).

Then, the master CPU 84 carries out a process for determining a position where an image of the image information is formed on the rear surface of the sheet (s27). In this process, as such a position, the master CPU 84 detects (1) a position facing an image formed on the front surface of the sheet, (2) a position facing a portion of an image formed on the front surface of the sheet whose color is similar to the color of an image of the image information to be formed on the rear surface of the sheet, and (3) a position facing a portion of an image formed on the front surface of the sheet whose density is similar to the density of an image of the image information to be formed on the rear surface of the sheet. Thus, in the light of the position of the image formed on the front surface of the sheet, it is possible to determine a position of an image of the image information to be formed on the rear surface of the sheet.

Thereafter, the master CPU 84 carries out a process for determining how the image of the image information is formed on the rear surface of the sheet (s28). In this process, as the state of the image information to be formed on the rear surface of the sheet, the master CPU 84 determines the size, the density, and the tones of an image of the image information in the light of the state of the image formed on the front surface of the sheet. The master CPU 84, in accordance with the position and the state of the image of the image information as determined in s27 and s28, respectively, carries out an image forming process relating to the image of the image information with respect to the rear surface of the sheet which has been transported from the intermediate tray 15 (s29).

According to the described processing, it is possible to provide, on the rear surface of the sheet having an image on its opposite surface, image information indicative of the contents of image processing conditions in accordance with the image processing. Thus, when forming the image recorded on the front surface of the sheet on another sheet, by referring to the image information thus provided on the rear surface of the sheet, it is possible to set optimum image forming conditions with ease.

Further, when providing image information on the rear surface of a sheet, a position and a state of the image information to be provided are determined in the light of a position and a state of the image formed on the front surface of the sheet. Therefore, when observing the image formed on the front surface of the sheet, the image information on the rear surface of the sheet neither protrudes from nor is seen through the image formed on the front surface of the sheet, thereby preventing the problem of low visibility of the image formed on the front surface of the sheet.

Note that, in the case of forming, on another sheet, the image formed on the front surface of the sheet having an image information on its rear surface, the image information may be read from the rear surface of the sheet before a document is transported so as to set image forming conditions based on the image information thus read.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming apparatus for providing image information on a rear surface of a sheet having an image on a front surface of the sheet, the image information indicative of contents of image forming conditions which are used when carrying out an image forming process with respect to the image formed on the front surface, and wherein a position and a state of the image information to be provided on the rear surface of the sheet is set based on a position and a state of the image formed on the front surface of the sheet.

2. An image forming apparatus according to claim 1, for reading image information provided on a rear surface of a document having an image on a front surface of the document so as to carry out an image forming process with respect to the image on the front surface of the document according to image forming conditions which have been set based on the image information thus read, comprising document reading means which includes a reading section for reading an image on a front surface of the document, and a recognizing section for recognizing image information read from a rear surface of the document, and further comprising a double-sided automatic document transporting device for transporting the document, such that the rear surface of the document faces document reading means when reading the image information from the rear surface of the document, and such that the front surface of the document faces the document reading means when carrying out the image forming process with respect to the front surface of the document.

3. An image forming apparatus, comprising:

document reading means comprising an image reading section for reading an image as an image signal from a document having the image on a front surface of the document and a recognizing section for recognizing image information read from a rear surface of the document;

an image forming section for forming a copy image on a sheet according to the image signal, the copy image being formed based on image forming conditions corresponding to the image signal; and a control section for providing the image signal in accordance with image information indicative of the image forming conditions, the image information being provided on a rear surface of the document, and further comprising:

detecting means for detecting a range of states, in which the image is processed, in said image reading section and/or said image forming section;

a judging section for judging, in response to said detecting means and the image information from said image reading section, whether or not at least partially the contents of the image information are set as the image forming condition;

and a selecting section for reading and/or recording image, when it is judged by said judging section that at least partially the contents of the image information are not set as the image forming condition, in accordance with another settable image forming condition included in the image information in response to said detecting means so as to alleviate required conditions.

4. An image forming apparatus according to claim 3, further comprising a reversing section for turning the document over according to an instruction from said control section.

5. The image forming apparatus as set forth in claim 4, wherein the image forming conditions are at least one selected from the group consisting of standard density of the document, distinction between a color document and a monochromatic document, separation information of photographic and character areas on the document, and separation information of copy and non-copy areas in the document.

6. An image forming apparatus, comprising:

a document reading means, comprising an image reading section for reading an image as an image signal from a document having the image on a front surface, and a recognizing section for recognizing image information read from a rear surface of the document;

an image processing section for generating image forming conditions corresponding to the image signal based on the image signal;

an image forming section for forming a copy image on a sheet according to the image signal, said copy image being formed based on the image forming conditions; and an image information providing section for providing image information indicative of contents of the image forming conditions on a rear surface of the sheet, and wherein said image processing section includes a detecting section for detecting a position and a state of the copy image formed on the front surface of the sheet, and said age information providing section includes setting means for setting a position and a state of the image information to be provided on the rear surface of the sheet base on the position and the state of the copy image as detected by said detecting section.

7. The image forming apparatus as set forth in claim 6, wherein the image information is one at least selected from the group consisting of mode selection, density setting, color balance setting, region separation information, and information of external devices.

8. An image forming method comprising the steps of:

forming an image on a front surface of a sheet according to an image signal based on the forming conditions; and providing image information indicative of contents of the image forming conditions on a rear surface of the sheet having the image on the front surface;

reading the image formed on a front surface of the sheet;

reading the back surface of the sheet, recognizing the image information on the rear surface of the sheet;

and generating an image corresponding the image on the front surface of the sheet in accordance with image forming conditions based on the image information read from the rear surface of the sheet, and further comprising the step of setting a position and a state of the image information to be provided on the rear surface of the sheet based on a position and a state of the image formed on the front surface of the sheet.

9. An image forming method according to claim 8, further comprising the step of transporting the document so as to turn over the document a period of reading the image information from the rear surface of the document and a period of carrying out the image forming process with respect to the image on the front surface of the document.

10. The image forming method as set forth in claim 9, further comprising the step of transporting the document so as to turn over the document between a period of reading the image information from the rear surface of the document and a period of carrying out the image forming process with respect to the image on th e front surface of the document.

11. The image forming method as set forth in claim 8, further comprising the step of generating the image forming conditions according to the image signal by an image forming process.

12. The method of claim 8, further comprising:

generating an image signal based on the image information read from the rear surface of the document; and generating an image in accordance with the image signal.

* * * * *